Nov. 3, 1953
J. DREW
2,657,397
GARBAGE GRINDER CONTROL MECHANISM AND
CONTROL MEANS THEREFOR
Filed Aug. 28, 1948
2 Sheets-Sheet 1
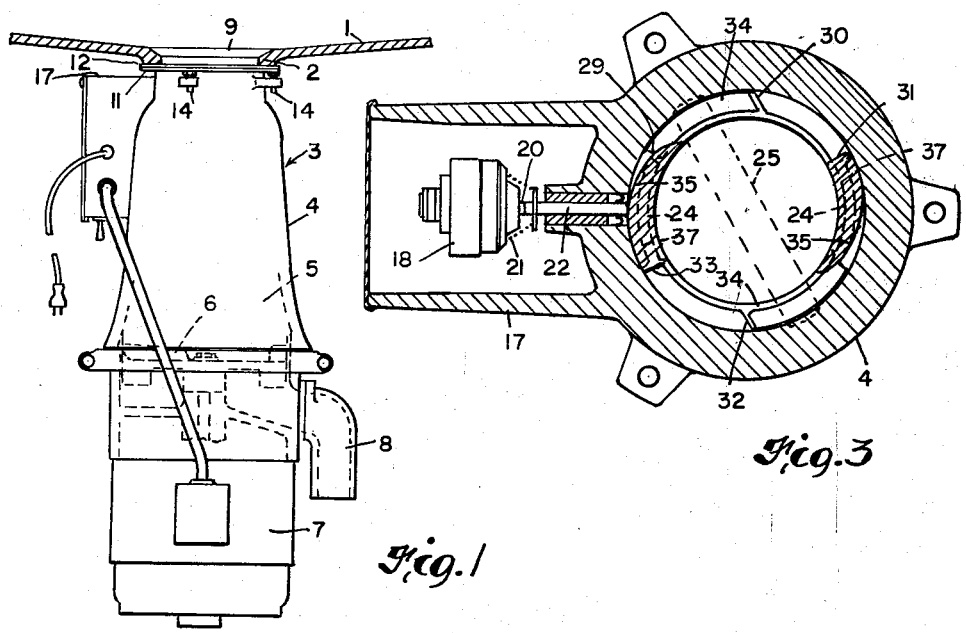
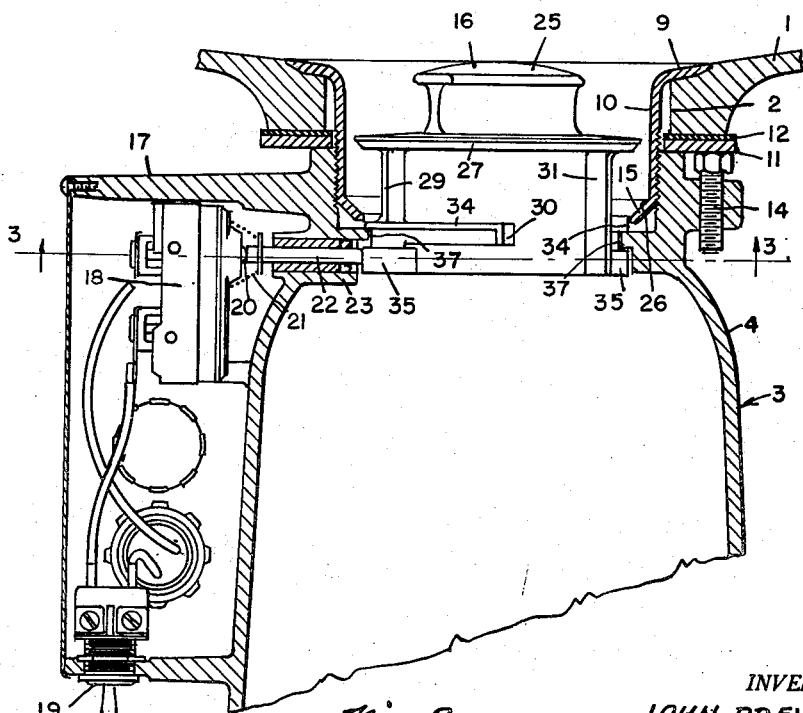
INVENTOR.
JOHN DREW
BY
Oberlin & Limbach
ATTORNEYS.

Nov. 3, 1953  J. DREW  2,657,397
GARBAGE GRINDER CONTROL MECHANISM AND
CONTROL MEANS THEREFOR
Filed Aug. 28, 1948 2 Sheets-Sheet 2

INVENTOR.
JOHN DREW
BY
Oberlin & Limbach
ATTORNEYS.

Patented Nov. 3, 1953

2,657,397

UNITED STATES PATENT OFFICE 2,657,397

GARBAGE GRINDER CONTROL MECHANISM AND CONTROL MEANS THEREFOR

John Drew, Kent, Ohio, assignor to National Rubber Machinery Company, Akron, Ohio, a corporation of Ohio Application August 28, 1948, Serial No. 46,606

12 Claims. (Cl. 4—190)

The present invention relates generally, as indicated, to a garbage grinder control mechanism, and more especially to a control mechanism which includes a control member in the nature of a stopper associated with the discharge opening of a sink from which the grinder is suspended.

A primary object of this invention is to provide a unitary control member which is selectively placeable in the discharge opening of a sink in any of a plurality of positions to render the grinder operative while water from the sink flows thereinto and to render the grinder inoperative when it is desired to use the sink in its ordinary manner.

Another object is to provide a control member which, when withdrawn from the sink opening, renders the grinder inoperative.

Another object is to provide a control member which renders the grinder inoperative when the sink opening is sealed thereby.

Another object is to provide a uniquely formed control member which, without any separate relatively movable parts, coacts with a seat and stop means formed in the passage leading from the sink to the grinder so as to be selectively placeable into such passage to permit or prevent communication between said sink and grinder.

Another object is to provide a control member so formed in relation to the aforesaid passage that it cannot be inadvertently shifted from one selected position to another.

Other objects and advantages will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of but one of the various ways in which the principle of the invention may be employed.

In the drawing—

Fig. 1 is a side elevation view of a typical garbage grinder which is adapted to be connected to a sink at its discharge opening so as to depend downwardly therefrom;

Fig. 2 is an enlarged vertical cross section view through the upper portion of the assembly illustrated in Fig. 1 with the control member in a position rendering the grinder operative and the passage from the sink to the grinder open so that water may flow into the comminuting mechanism to facilitate grinding and flushing away of refuse;

Fig. 3 is a horizontal cross section view taken substantially along line 3—3, Fig. 2;

Figure 4:
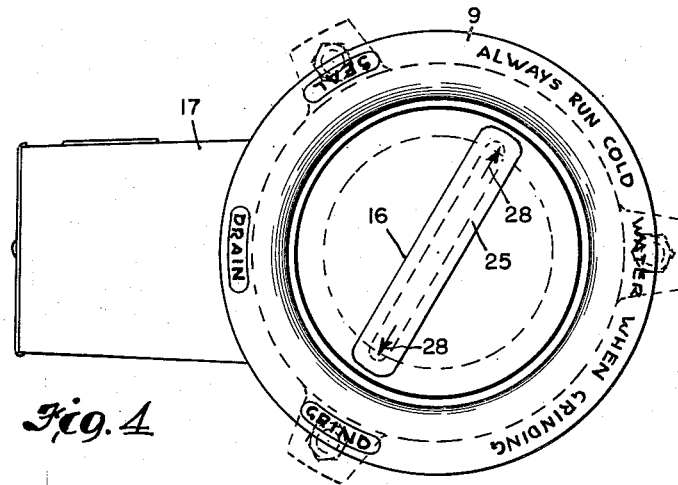
Fig. 4 is a top plan view illustrating the control member selectively placed into the sink opening to render the grinder operative as in Fig. 2.

Referring now to the drawing and first to Fig. 1, there is shown therein a portion of a typical sink 1 having a drain opening 2 in its bottom wall to which is connected a garbage grinder 3. Said grinder may be of any desired form but is herein exemplarily illustrated as comprising a housing 4 providing a refuse receiving cavity 5 below such sink opening 2 within which an impeller 6 rotated by an electric motor 7 is operative to comminute refuse deposited into such cavity. With the assistance of water (preferably cold) flowing into such cavity from the sink, the refuse comminuted therein will be flushed away to a sewer or the like through the discharge pipe 8 which is connected to the lower end of such cavity. The construction and operation of this apparatus is fully disclosed in the copending application of Allen L. Heston et al., Serial No. 730,930, filed February 26, 1947, now abandoned, of which I am one of the inventors.

As herein illustrated, the connection between said sink 1 and said grinder 3 comprises a sink flange 9 engaging the upper edge of the sink opening and having its neck 10 projecting downwardly through such opening into threaded engagement with the upper end of grinder housing 4. A ring 11 carrying a gasket 12 thereabove and encircling said flange is urged upwardly into clamping and sealing relation with the lower edge of such sink opening as by bolts 14 which have threaded engagement in the upper portion of said housing with the heads thereof engaging the bottom face of ring 11.

The lower end of said sink flange is turned inwardly as at 15 to form a seat 26 for the control member 16 to be presently described.

As illustrated in Fig. 4, said sink flange 9 is provided with legends thereon denoting a plurality of positions in which the control member 16 may be selectively placed thereinto. In the present case such legends are "Seal," "Drain," and "Grind," and as is apparent in the first two the grinder should be inoperative while the sink opening is respectively closed and open and in the third, the grinder should be operative while the sink opening is open.

Figure 7:
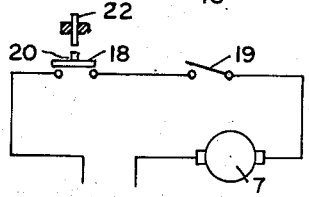
Fig. 7 is a schematic wiring diagram of the grinder motor and control switch therefor.

Said housing 4 is formed with a switch box 17 thereon with a motor control switch 18 therein connected in series with the motor 7 as shown in Fig. 7. Also, in series with the motor 7 is a toggle or like switch 19 for imposing a supplemental manual control for the motor 7, said switch being generally flicked to closed position and retained there except in instances when it is desired to render the grinder inoperative even though the control member is in the "Grind" position.

Said control switch 18 is preferably of the normally open type and is provided with an outwardly urged actuating button 20 which together with a spring 21 yieldably urges a plunger 22 radially inward of said housing 4 through a boss 23 formed in the latter. As shown, the rotative disposition of said grinder and sink flange is preferably such that said boss 23 is directly below the legend "Drain" on the sink flange.

The upper portion of housing 4 is formed with a pair of diametrically opposed inwardly extending lugs or projections 24 one of which is disposed directly above the plunger 22, said lugs or projections functioning, as will hereinafter appear, as positioning and supporting means for the control member 16, said control member in effect constituting a valve member and a switch operating key.

Referring now in detail to said control member 16, the same is preferably formed with a handle 25 by which it may be conveniently removed from, placed into, and rotated in the passage defined by said sink flange and the upper portion of the grinder. Said member is also formed with a seat 27 adapted to engage the seat 26 formed in said sink flange when either of the diametrically opposed arrows 28 on the former is directed toward the legend "Seal" on said flange, and adapted to be spaced from said seat 26 when either of such arrows is directed toward the legends "Drain" and "Grind."

Figure 5:
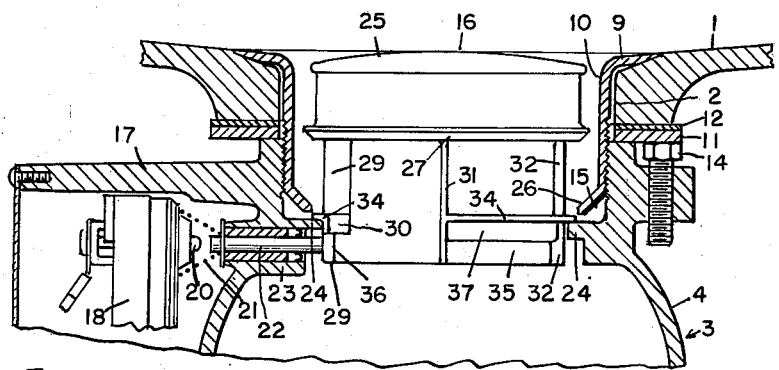
Figs. 5 and 6 are cross section views similar to Fig. 2 except illustrating the control member respectively in a position for draining the sink and rendering the grinder inoperative and in a position for sealing the sink and rendering the grinder inoperative.

Below said seat 27 the control member is preferably of generally tubular or cylindrical form with a plurality of axially extending ribs thereon. Herein there are five such ribs 29 to 33 defining spaces therebetween of greater width than the previously described lugs in order to facilitate selective placement of said member in the passage leading from the sink into the grinder. Axially spaced from said seat 27 and above the lower end of said member is a radially projecting flange 34 which is interrupted between the pairs of adjacent ribs 30—31 and 32—33, the lower surface of such flange being engageable with the upper surfaces of the lugs 24 as shown in Figs. 2 and 5 to thus retain the seat 27 out of engagement with the seat 26 in the sink flange. In both of these positions water may freely flow past the seats 26 and 27 and between the spaces between the control member 16 and the housing 4 into the grinder 3.

In order to render the grinder operating motor 7 operative when the control member 16 is rotated from the draining position to the grinding position there is provided between each of the pairs of ribs 33—29 and 31—32 a cam surface 35 which, as shown in Figs. 2 and 3 is operative when the control member is inserted into the sink flange 9 in the "Drain" position and rotated to the "Grind" position to shift the plunger 22 radially outward and thus actuate the button 20 of switch 18 to thus close the motor circuit. With the motor thus in operation refuse previously deposited into the cavity 5 will be comminuted by the action of the impeller 6 and flushed away by the action of water flowing from the sink into the grinder. It can now be seen that when the control member 16 is rotated back to the "drain" position and removed, if desired, from the sink flange 9, the button 20 and the spring 21 will move the plunger 22 radially inward whereby the switch 18 will assume its normally open position to thus render the motor 7 inoperative.

As shown in Fig. 5, when the control member 17 is placed into the sink flange 9 with one of its arrows 28 pointing to "Drain," no actuation of the plunger 22 will be effected because the cam surfaces 35 are then circumferentially spaced from the plunger 22, the outer surface 36 of the tubular body being radially inward of the innermost position of the inner end of said plunger. As evident, the ribs 30 and 32 each engage or abut one end of the respective lugs 24 and then serve to lock said control member against rotation except in one direction from the "Drain" to "Grind" position. In the "Grind" position the ribs 31 and 33 each abut the other end of the respective lugs 24 so that said control member can only be rotated in one direction from "Grind" to "Drain."

Figure 6:
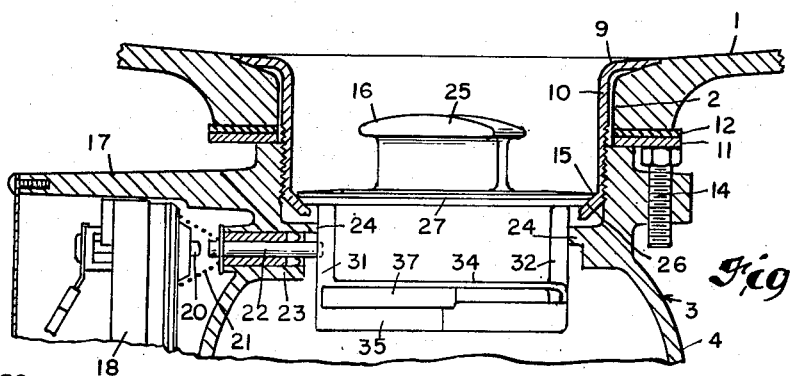

Should it be desired to seal the sink opening, the control member is simply inserted into the sink flange into the position of Fig. 6 with either of its arrows 28 pointing toward the legend "Seal" on said sink flange. In this position, the spaces between the pairs of adjacent ribs 30—31 and 32—33 will be in register with the lugs 24 and because the flange 34 on said control member is interrupted in these regions, the control member will drop down to a position with the seat 27 thereof in engagement with the seat 26 in the sink flange. Here again no actuation of the plunger 22 will occur.

Referring again to the cam surfaces 35 on said control member 16, it is to be noted that thereabove circumferential grooves 37 are provided which embrace the lugs 24 to prevent inadvertent withdrawal or displacement of the member from its "Grind" position as might otherwise occur by the agitation of refuse within the grinder.

In summary, it can be seen that I have provided a unitary control member which is readily placeable into the sink flange in any of a plurality of positions, viz. "Seal" and "Drain," and rotatable from the latter position to the "Grind" position wherein said member is locked against axial withdrawal. In addition, because the spaces between the ribs thereon are somewhat greater than the width of the lugs on the grinder housing 4 exact rotative alignment between the control member and the sink flange is not required. Furthermore, as apparent from the several drawings, said ribs prevent rotation of the control member from one of said first-named plurality of positions to the other without first axially shifting the control member before turning it to the other one of the plural positions.

With a control mechanism such as disclosed, the grinder is rendered inoperative or operative simply by rotating the control member a part turn from "Grind" to "Drain" or "Drain" to "Grind." In the normal usage of the sink, the sink opening may be closed by axially shifting the control member from "Drain" and turning the same to "Seal" whereupon it drops between lugs 24 thereby permitting seats 26 and 27 to engage one another, such actuation being accomplished without any possibility of inadvertently rendering the grinder operative. With apparatus of the character indicated, I have found it unnecessary to provide a strainer element comprising, for example, relatively rotatable perforated plates inasmuch as larger pieces of refuse which may flow past the control member can be conveniently ground if such will not freely flow past the impeller 6.

A further feature of the present invention is that the location of the plunger 22 beneath one of the lugs 24 obviates the possibility of operating the grinder when loading refuse thereinto and thus precluding injury to persons who may reach thereinto. A further safety feature in this respect is the provision of the manual switch 19 disposed under the sink 1. Still another important feature which facilitates installation of the grinder to any conventional sink is that there is a fixed relation between the control member positioning and supporting means; viz., the lugs 24 and the plunger 22 whereby the thickness of the sink 1 or the amount that the sink flange 9 is screwed into the housing 4 will not disturb the positioning of the control member cam surfaces 35 and locking grooves 37 relative to the plunger 22 and lugs 24.

It is to be noted that when the control member is in either the "Drain" or "Grind" position, the sink passage is not fully open and therefore such positions are referred to in the appended claims as "partially sealing positions" to denote that the control member is in the passage but permits flow of water into the comminuting chamber or cavity.

Other modes of applying the principle of the invention may be employed, change being made as regards the details described, provided the features stated in any of the following claims, or the equivalent of such, be employed.

I therefore particularly point out and distinctly claim as my invention:

1. A control member for comminuting apparatus and the like comprising a generally cylindrical body, first and second flanges projecting radially from said body, said first flange being continuous and of larger diameter than said second flange and constituting a seat for engagement with a seat therefor surrounding an opening leading into such apparatus, said second flange being adapted, in a first rotary position of said body in such opening, to engage a radially inwardly extending projection in such opening for supporting said body in an elevated position with said first flange spaced from its seat, and in a second rotary position of said body in such opening to clear such projection and permit engagement of said first flange with its seat, a cam on said body engageable with means on said apparatus only when said body is supported in said elevated position for energizing said apparatus when said body is thus supported.

2. The control member of claim 1 wherein said body has circumferentially spaced ribs extending axially thereof arranged to straddle such projection when said first flange is on its seat to prevent rotation of said body relative to such apparatus when in that position.

3. The control member of claim 1 wherein said cam extends circumferentially of said body, said body, when supported in said elevated position, being rotatable in such opening between positions whereat said cam engages and disengages the means for energizing said apparatus.

4. The control member of claim 3 wherein said body, between said second flange and said cam, is formed with a circumferentially extending groove adapted to embrace such projection when said cam engages the means for energizing said apparatus whereby to retain said body from withdrawal axially from such opening.

5. The control member of claim 3 wherein said body has circumferentially spaced ribs extending axially thereof and adapted to engage the opposite ends of such projection to limit the degree of rotation of said body in opposite directions between apparatus energizing and de-energizing positions.

6. The control member of claim 5 wherein said ribs are further adapted to straddle such projection when said first flange is on its seat to thereby prevent rotation of said body relative to such apparatus.

7. The control member of claim 4 wherein said body has circumferentially spaced ribs extending axially thereof and adapted to engage the opposite ends of such projection to limit the degree of rotation of said body in opposite directions between apparatus energizing and de-energizing positions.

8. In a control mechanism for an electric motor operated garbage grinder and the like, a tubular unit providing a downwardly extending garbage feed and sink drain opening adapted to lead into such grinder and including a seat adjacent its upper end, a projection below said seat extending radially inwardly thereof, and a switch operating element supported for movement to energize and de-energize such garbage grinder and disposed below said seat and extending radially inwardly thereof, and a unitary stopper for said opening adapted to be selectively inserted therein in different rotary sealing and draining positions for use of the sink in its customary manner to retain water therein and to drain water therefrom, said stopper comprising a generally cylindrical body of size to permit flow of water therebetween and said seat when said stopper is inserted in such draining position, an imperforate disc portion projecting radially from said body adapted to engage and to be spaced above said seat when said stopper is inserted in such sealing and draining positions respectively, a circumferentially interrupted flange projecting radially from said body for engaging said projection and thus supporting said stopper in such draining position and for clearing said projection in such sealing position whereby said stopper drops down to engage its disc portion with said seat, and a circumferentially extending cam projecting radially from said body adapted, upon rotation of said stopper while supported as aforesaid in such draining position, to move said element for energizing the grinder whereby water may flow through said opening to assist in the grinding operation and to flush away the ground garbage.

9. The control mechanism of claim 8 wherein said body is formed with a circumferentially extending groove which, upon rotation of said stopper to element moving position, embraces said projection to retain said stopper against upward movement relative to said opening.

10. The control mechanism of claim 8 wherein said body is provided with circumferentially spaced, axially extending ribs projecting radially therefrom adapted to engage the opposite ends of said projection and thus constitute stops for restricting rotation of said stopper between draining and element moving positions and vice versa.

11. The control mechanism of claim 8 wherein said body is provided with circumferentially spaced, axially extending ribs projecting radially therefrom which are adapted to straddle said projection in the sealing position of said stopper whereby to prevent rotation of said stopper to draining position except by first raising said stopper to a position whereat said ribs are above said projection.

12. The control mechanism of claim 8 wherein said body is provided with circumferentially extending groove which, upon rotation of said stopper to element moving position, embraces said projection to retain said stopper against upward movement relative to said opening and said body is further provided with circumferentially spaced, axially extending ribs projecting radially therefrom which are adapted to engage the opposite ends of said projection and thus constitute stops for restricting rotation of said stopper between draining and element moving positions and vice versa, such groove being circumferentially spaced from said projection in the draining position of said stopper whereby said stopper may be raised to a position whereat said ribs are above said projection to enable rotation of said stopper for insertion in such sealing position.

JOHN DREW.

References Cited in the file of this patent

UNITED STATES PATENTS

| Number | Name | Date |
|---|---|---|
| 1,613,251 | Stead | Jan. 4, 1927 |
| 2,185,037 | Powers | Dec. 26, 1939 |
| 2,244,402 | Powers | June 3, 1941 |
| 2,428,420 | Green | Oct. 7, 1947 |
| 2,477,686 | Coss | Aug. 2, 1949 |
| 2,484,459 | Osborn | Oct. 11, 1949 |
| 2,588,182 | Van Ranst | Mar. 4, 1952 |